United States Patent [19]

Okazaki et al.

[11] Patent Number: 4,923,277
[45] Date of Patent: May 8, 1990

[54] OPTICAL WAVELENGTH CONVERTER DEVICE

[75] Inventors: Yoji Okazaki; Koji Kamiyama, both of Kanagawa, Japan

[73] Assignee: Fuji Photo Film Co., Ltd., Kanagawa, Japan

[21] Appl. No.: 265,986

[22] Filed: Nov. 2, 1988

[30] Foreign Application Priority Data

Nov. 2, 1987 [JP] Japan .................... 62-277678
Mar. 8, 1988 [JP] Japan .................... 63-54616

[51] Int. Cl.$^5$ ............................................. G02F 1/35
[52] U.S. Cl. .............................. 350/96.29; 307/430; 350/96.15
[58] Field of Search ............... 350/96.12, 96.15, 96.29, 350/96.30, 96.31, 96.32, 96.33, 96.34; 307/425–430

[56] References Cited

U.S. PATENT DOCUMENTS

| 3,935,472 | 1/1976 | Bethea et al. ............. 350/96.12 X |
| 4,737,011 | 4/1988 | Iri et al. ................... 350/96.34 X |
| 4,763,019 | 8/1988 | Duguay et al. ................ 307/427 |
| 4,815,079 | 3/1989 | Snitzer et al. ............ 350/96.33 X |
| 4,820,011 | 4/1989 | Umegaki et al. ........... 350/96.15 X |

Primary Examiner—John D. Lee
Attorney, Agent, or Firm—Sughrue, Mion, Zinn, Macpeak & Seas

[57] ABSTRACT

An optical wavelength converter device of the optical fiber type includes a core made of a nonlinear optical material and cladding surrounding the core for converting a wave having a fundamental frequency, which wave is applied to an end of the core, to its second harmonic and radiating the second harmonic into the cladding in such a way as to eliminate interference between the waves traveling in a guided mode in which the fundamental is guided through the core and the waves traveling in a radiation mode in which the second harmonic is radiated into the cladding. The cladding has a diameter of at least 500 $\mu$m.

5 Claims, 3 Drawing Sheets

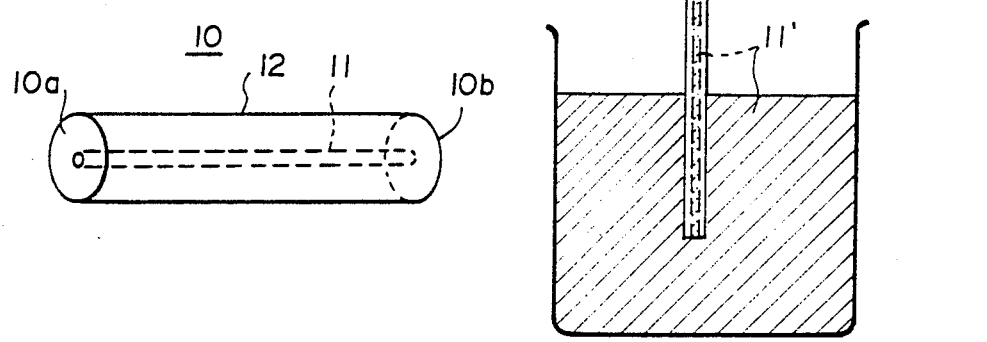
FIG. 1
FIG. 3
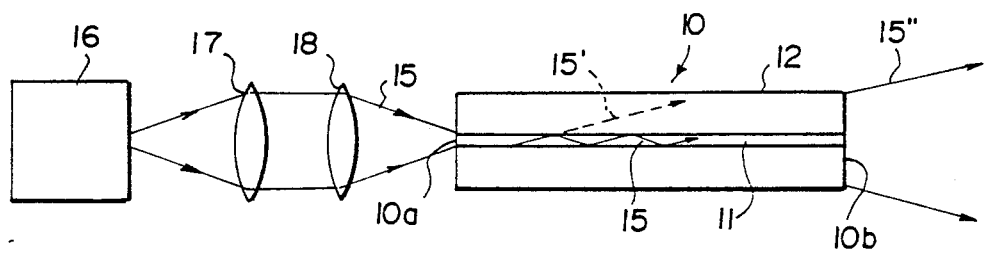
FIG. 2
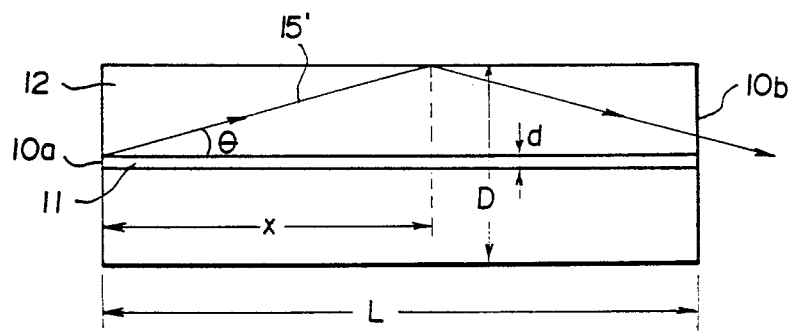
FIG. 4

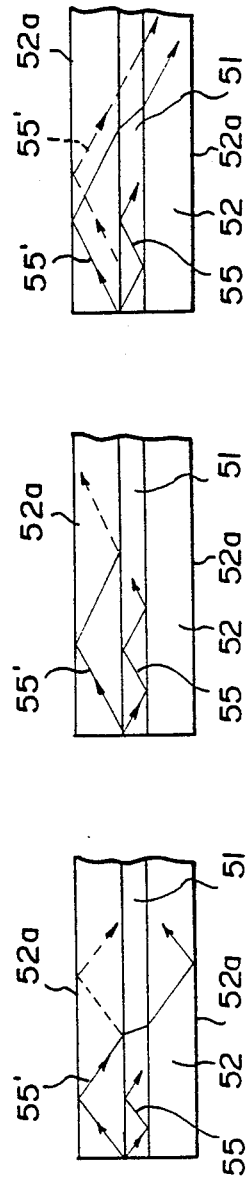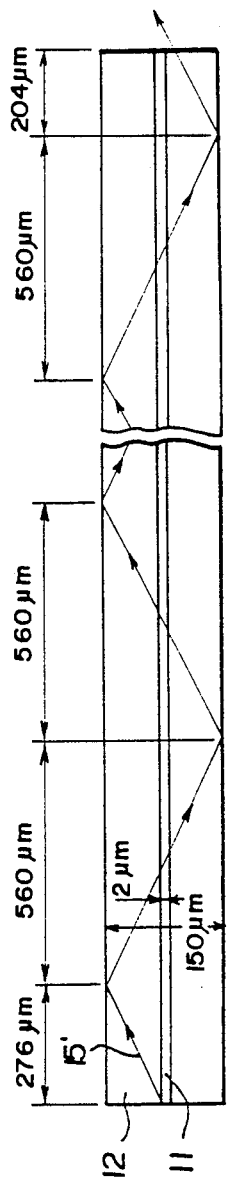

OPTICAL WAVELENGTH CONVERTER DEVICE

BACKGROUND OF THE INVENTION

1. Field of the Invention

The present invention relates to an optical wavelength converter device for converting a wave having a fundamental frequency, hereinafter the fundamental, to its second harmonic, which has a wavelength which is ½ the wavelength of the fundamental, and more particularly to an optical wavelength converter device of the fiber type for eliminating phase interference between waves traveling in a guided mode in which a fundamental is guided through a core and waves traveling in a radiation mode in which a second harmonic is radiated into a cladding.

2. Description of the Prior Art

Various attempts have heretofore been made for converting the wavelength of a laser beam into a shorter wavelength based on the generation of a second harmonic by a nonlinear optical material. One example of an optical wavelength converter device for effecting such laser wavelength conversion is a bulk crystal type converter device as disclosed, for example, in *Introduction to Optical Electronics* written by A. Yariv and translated by Kunio Tada and Takeshi Kamiya (published by Maruzen K. K.), pages 200–204. This optical wavelength converter device relies upon the birefringence of a crystal in order to meet phase matching conditions. Therefore, any material which does not exhibit birefringence or exhibits only small birefringence cannot be employed even if it has high nonlinearity.

A fiber type optical wavelength converter device has been proposed to solve the above problem. The optical wavelength converter device of this type is in the form of an optical fiber comprising a core made of a nonlinear optical material surrounded by a cladding. One example of such an optical fiber is shown in Vol. 3, No. 2, pp. 28–32 of the bulletin of the microoptics research group of a gathering of the Applied Physics Society. Recently, many efforts have been directed to the study of fiber type optical wavelength converter devices since they can easily eliminate interference between waves traveling in a guided mode in which a fundamental is guided through the core and waves traveling in a radiation mode in which a second harmonic is radiated into the cladding (for so-called Cherenkov radiation).

One problem which has been recognized with respect to such a fiber type optical wavelength converter device is that the phase of the second harmonic tends to be disturbed while the second harmonic is traveling toward an end of the device by being repeatedly and totally reflected between outer surfaces of the cladding. When the phase of second harmonic is disturbed, the intensity of the second harmonic which is eventually emitted from the optical wavelength converter device is lowered and so is the wavelength conversion efficiency. It also becomes impossible to sufficiently converge the second harmonic that has been emitted from the converter device.

Moreover, the second harmonic is apt to be absorbed by the core as it travels through the fiber type optical wavelength converter device while repeatedly undergoing total reflection. Such second harmonic absorption also lowers the wavelength conversion efficiency, and makes it difficult to extract a second harmonic with a high intensity, which is a short and easily absorbed wave.

SUMMARY OF THE INVENTION

In view of the aforesaid drawbacks of the conventional optical wavelength converter devices, it is an object of the present invention to provide an optical wavelength converter device capable of preventing the phase of a second harmonic from being disturbed, capable of preventing the second harmonic from being absorbed by a core, and also capable of producing a second harmonic in the form of a high intentity short wave.

According to the present invention, an optical wavelength converter device of the optical fiber type comprising a core made of a nonlinear optical material and a cladding surrounding the core, for converting a fundamental applied to an end of the core to a second harmonic and radiating the second harmonic into the cladding to eliminate interference between waves traveling in a guided mode in which the fundamental is guided through the core and waves traveling in a radiation mode in which the second harmonic is radiated into the cladding, the cladding having a diameter of at least 500 μm.

The phase of a second harmonic is considered to be disturbed for any of the following reasons:

(1) As shown in FIG. 5(a) of the accompanying drawings, a second harmonic 55' travels toward an end of the optical wavelength converter device while repeatedly undergoing total reflection by outer surfaces 52a of a cladding 52 surrounding a core 51. Due to the difference between the refractive indexes of the cladding 52 and the core 51, the second harmonic 55' is subjected to Fresnel reflection, as indicated by the dotted lines, and the second harmonic 55' that has passed through the core 51 and the second harmonic 55' that has undergone the Fresnel reflection become out of phase with each other.

(2) Where the refractive index of the cladding 52 with respect to the second harmonic is higher than that of the core 51, the second harmonic 55' is subjected to total reflection at the boundary between the core 51 and the cladding 52, as indicated by the dotted line in FIG. 5(b), which results in disturbance of the phase.

(3) If the core 51 is positioned out of coaxial alignment with the cladding 52, then a second harmonic 55' passes through the core 51 and another second harmonic 55' does not pass through the core 51 as indicated by the solid and dotted lines in FIG. 5(c), and these harmonics 55' become out of phase with each other.

Conventional fiber type optical wavelength converter devices normally have a cladding diameter of 100 μm, or about 250 μm at maximum, and a core diameter ranging from 1 to 10 μm. The longer the optical wavelength converter device, the greater the wavelength conversion efficiency thereof. For practical purposes, an optical wavelength converter device requires a length of 30 mm or more. Where the cladding diameter, the core diameter, and the device length are in the numerical ranges described above, a second harmonic radiated from the core into the cladding is repeatedly totally reflected by an outer cladding surface several tens of times at maximum. Therefore, the problems described above in the paragraphs (1), (2), and (3) frequently occur, and the phase of the second harmonic is significantly disturbed. The more frequently the second harmonic undergoes total reflection, the more frequently the second harmonic enters the core and the more it is absorbed by the core.

According to the optical wavelength converter device of the present invention, the cladding diameter is very large, being at least 500 μm. Therefore, the number of times a second harmonic is subjected to total reflection by an outer surface of the cladding is reduced to half or less than half of the number of times a second harmonic is subjected to total reflection in a conventional optical wavelength converter device. The drawbacks described in the above paragraphs (1), (2), and (3) are reduced, which effectively prevents the phase of the second harmonic from being disturbed and also prevents the second harmonic from being absorbed by the core.

For more reliably preventing the absorption of the second harmonic by the core, the optical wavelength converter device should be constructed so as to entirely prevent the second harmonic from reentering the core, by selecting the diameter of the cladding to be $L \cdot \tan\theta + d$ or more, where d is the diameter of the core, $\theta$ the phase matching angle of the second harmonic, and L the length of the device.

Where the cladding diameter is selected to be $2L \cdot \tan\theta + d$ or greater, the second harmonic does not reenter the core, and because it is phase-matched the second harmonic is not subjected to total reflection by an outer cladding surface. Thus, a second harmonic which is emitted from the cladding end after total reflection by an outer cladding surface and another second harmonic which is directly emitted from the cladding end without total reflection do not become out of phase with each other. Consequently, the wavelength conversion efficiency is not lowered by phase disturbance which would otherwise be present, and the difficulty with converging the second harmonic is eliminated.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 1 is a perspective view of an optical wavelength converter device according to an embodiment of the present invention;

FIG. 2 is a schematic side elevational view of the optical wavelength converter device shown in FIG. 1;

FIG. 3 is a schematic view illustrating a process for manufacturing the optical wavelength converter device shown in FIG. 1;

FIG. 4 is a schematic view of an optical path of a second harmonic in the optical wavelength converter device;

FIGS. 5(a), 5(b), and 5(c) are views explaining the causes of phase disturbances of a second harmonic in a conventional fiber type optical wavelength converter device;

FIG. 6 is a schematic view of an optical path of a second harmonic in a conventional fiber type optical wavelength converter.

DESCRIPTION OF THE PREFERRED EMBODIMENTS

Figure 7:
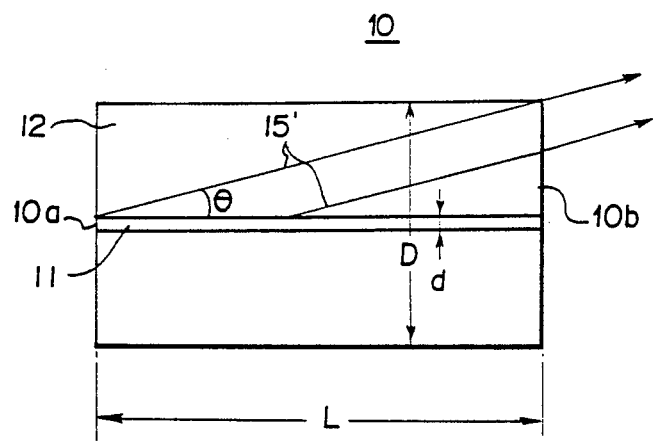
FIG. 7 is a schematic view of an optical path of a second harmonic in a fiber type optical wavelength converter device according to another embodiment of the present invention.

FIGS. 1 and 2 show an optical wavelength converter device 10 according to an embodiment of the present invention. The optical wavelength converter device 10 comprises an optical fiber including a core 11 made of a nonlinear optical material, which core 11 is filled into a hollow space located centrally in cladding 12. The nonlinear optical material should preferably be an organic nonlinear optical material having a high wavelength conversion efficiency, as described above. In the illustrated embodiment, the core 11 is made of 5-dimethyl-1-(4-nitrophenyl)pyrazole (hereinafter referred to as "PRA"), as disclosed in Japanese Patent Application No. 61-53884 filed by the applicant of the present application.

A process for manufacturing the optical wavelength converter device 10 by making the core 11 of PRA and the cladding 12 of SFS3 glass will be described below. A hollow glass fiber 12' (FIG. 3) which will serve as the cladding 12 is provided, the hollow glass fiber 12' having an outside diameter of about 3 mm and the hollow space therein having a diameter of 2 μm. As shown in FIG. 3, PRA 11' is kept as a molten solution in a furnace, and one end of the glass fiber 12' is immersed in the molten PRA 11'. Then, the PRA 11' in the molten state enters the hollow space in the glass fiber 12' due to capillarity. The molten solution is kept at a temperature slightly higher than the melting point (102° C.) thereof in order to prevent the PRA 11' from being decomposed. Thereafter, the glass fiber 12' is quickly cooled to cause the PRA 11' in the hollow space to be polycrystallized.

Then, the glass fiber 12' is gradually pulled from the furnace, which is kept at a temperature (e.g., 102.5° C.) higher than the melting point of the PRA 11', into an outer space which is kept at a temperature lower than that melting point, thereby causing the PRA 11' to be monocrystallized continuously at the point where it is withdrawn from the furnace. The core 11 thus prepared is of a highly long monocrystalline form with a uniform crystal orientation, and hence the optical wavelength converter device 10 is sufficiently long. Since the wavelength conversion efficiency of the optical wavelength converter device of this type is proportional to the length of the device, as is well known in the art, the longer the optical wavelength converter device, the greater the practical value of the device.

After the core 11 is filled into the hollow area in the glass fiber 12', the opposite ends of the glass fiber 12' are suitably cut off to finish the manufacturing of the optical wavelength converter device 10, as shown in FIGS. 1 and 2. In this embodiment, the optical wavelength converter device 10 has a length of 10 mm.

The optical wavelength converter device 10 will be used as shown in FIG. 2. More specifically, a semiconductor laser (wavelength: 870 nm) 16, for example, is employed as a means for generating a fundamental. A laser beam (fundamental) 15 emitted as a divergent beam from the semiconductor laser 16 is converted by a collimator lens 17 into a parallel-ray beam which is converged by an objective lens 18 onto an end surface 10a of the converter device 10 so that the beam 15 enters the optical wavelength converter device 10. The fundamental 15 is then converted to a second harmonic 15', having a wavelength which is ½ that of the fundamental 15, by the PRA, from which the core 11 is made.

The second harmonic 15′ is radiated into the cladding 12, and progresses through the device 10 toward the other end thereof while repeatedly undergoing total reflection by the outer surfaces of the cladding 12, and phase interference between waves traveling in a guided mode in which the fundamental 15 is guided through the core 11 and waves traveling in a radiation mode in which the second harmonic 15′ is radiated into the cladding 12 (so-called "Cherenkov radiation").

A beam 15″ which includes the second harmonic 15′ is emitted from an exit end surface 10b of the optical wavelength converter device 10. The emitted beam 15″ is passed through a filter (not shown) which allows only the second harmonic 15′ to pass therethrough. Therefore, only the second harmonic 15′ is extracted for use.

The cladding 12 made of SFS3 glass has refractive indexes $n_{clad}^{\omega}$, $n_{clad}^{\omega}$ with respect to the fundamental 15 (wavelength: 870 nm) and the second harmonic 15′ (wavelength: 435 nm), respectively. These refractive indexes are as follows:

$$n_{clad}^{\omega}=1.76, \; n_{clad}^{\omega}=1.84$$

The core 11 of PRA has a refractive index $n_{core}^{\omega}=1.78$ with respect to the fundamental 15. Therefore, $$n_{clad}^{\omega} < n_{core}^{\omega} < n_{clad}^{\omega}$$

and wave guiding conditions are met.

The phase matching angle $\theta$ of the second harmonic 15′ radiated into the cladding 12 is about 15°. As described above, the cladding diameter D is 3 mm, the core diameter d is 2 μm, and the device length L is 10 mm. Based on these numerical values, the second harmonic 15′ that travels along the longest path within the device 10 and can maintain a proper phase relationship with other waves emitted from the converter device, as shown in FIG. 4 (i.e., the second harmonic 15′ which is produced closest to the entrance end surface 10a of the device 10 at the outermost peripheral portion of the core 11) will be analyzed below. The distance x which this second harmonic 15′ traverses in the longitudinal direction of the device 10 until it reaches the outer peripheral surface of the cladding 12 is given by:

$$\begin{aligned} x &= (D-d)/(2\tan\theta) \\ &= (3000-2)/(2\tan 15°) \\ &= 5593 \; \mu m \end{aligned}$$

In order for the second harmonic 15′ to reenter the core 11 through total reflection by the outer surface of the cladding 12, it is necessary that the length of the optical wavelength converter device 10 be:

$$2x = 11186 \; \mu m = 11.19 \; mm$$

Inasmuch as the length L of the optical wavelength converter device 10 of this embodiment is 10 mm, however, the above second harmonic 15′ does not actually reenter the core 11. Because the second harmonic 15′ analyzed above traverses the longest path in the device 10, all the second harmonics 15′ radiated into the cladding 12 at the phase matching angle $\theta$ do not reenter the core 11. Consequently, any phase disturbance which would otherwise occur if the second harmonic reentered the core does not occur.

In the absence of phase disturbance of the second harmonic 15′, a second harmonic of high intensity can be extracted from the optical wavelength converter device 10, and the wavelength conversion efficiency is high. In this embodiment, the wavelength conversion efficiency was about 10% with an input power of 100 mW. An optical wavelength converter device according to a comparative example was prepared in which the diameter D of the cladding was 150 μm and the other dimensions were the same as those of the above embodiment, and the wavelength conversion efficiency of this optical wavelength converter device was about 2% with an input power of 100 mW. In the optical wavelength converter device according to the comparative example, as shown in FIG. 6, the second harmonic 15′ along the longest path travels 276 μm (=74/tan 15°) in the longitudinal direction of the device until it first reaches the outer surface of the cladding 12, and travels 560 μm (=150/tan 15°) in the longitudinal direction of the device in one cycle in which it is totally reflected by the outer surface of the cladding. Therefore, if the length of the device is 10 mm (=10,000 μm), the second harmonic 15′ reenters the core 11 seventeen times since $$10,000 = 560 \times 17 + 276 + 204.$$

As is apparent from the foregoing description with reference to FIG. 4, all the second harmonic waves can be matched in phase with each other do not reenter the core. If the following relationship is met the second harmonics will not reenter the core:

$$\frac{D-d}{2} > \frac{L}{2}\tan\theta$$

where D is the diameter of the cladding, d the diameter of the core, L the length of the device, and $\theta$ the phase matching angle, i.e., if the diameter of the cladding is set according to the following equation:

$$D > L \cdot \tan\theta + d.$$

More preferably, the diameter D of the cladding may be increased to satisfy the following:

$$D > 2L \cdot \tan\theta + d$$

FIG. 7 shows an optical wavelength converter device having a cladding diameter according to another embodiment of the present invention. As illustrated in FIG. 7, all the second harmonics 15′ that are in phase with each other do not reenter the core 11 and also never undergo total reflection by the outer surface of the cladding 12. In the illustrated arrangement, no phase distortion is produced in the second harmonic 15′, which is totally reflected by the outer surface of the cladding 12 and emitted from the exit end surface 10b of the device, nor is any phase distortion produced in a second harmonic 15′ emitted directly from the exit end surface 10b without having been totally reflected. Therefore, any reduction in the wavelength conversion efficiency due to the second harmonics+ interfering with each other, and any difficulty in coverging the second harmonic, which would otherwise result from phase differences between the second harmonics, are eliminated, so that a highly intensive light spot with the frequency of a second harmonic can be obtained.

Rather than satisfying the above condition, the diameter of the cladding may be selected to be 500 μm or more to greatly reduce the number of times the second harmonic reenters the core as compared with conventional fiber type optical wavelength converter devices. This also effectively prevents any phase disturbance of the second harmonic.

With the cladding diameter thus selected, the number of times the second harmonic 15' passes through the core is reduced, and hence the absorption by the core of the second harmonic is reduced. Where the cladding diameter is sufficiently large, such absorption is entirely eliminated, and a higher intensity second harmonic can be extracted from the device. If the absorption by the core of the second harmonic is small or eliminated, then the second harmonic, form of a short wave which tends to be easily absorbed by the core, can be extracted from the converter device with high intensity.

With the present invention, as described above, by selecting the cladding diameter to be 500 μm or more, the number of times the second harmonic reenters the core is greatly reduced when compared with conventional optical wavelength converter devices. According to the optical wavelength converter device of the present invention, second harmonic phase disturbance is effectively prevented, and a high intensity light beam with a second harmonic frequency can be extracted with a high wavelength conversion efficiency. The second harmonic can be converged to a sufficiently small spot.

When the number of times the second harmonic reenters the core is reduced the second harmonic is prevented from being absorbed by the core. As a result, the wavelength conversion efficiency is increased, and a second harmonic, which is in the form of a short wave that tends to be easily absorbed by the core, with a high intensity can be obtained.

Although certain preferred embodiments have been shown and described, it should be understood that many changes and modifications may be made thereto without departing from the scope of the appended claims.

We claim:

1. An optical wavelength converter device comprising:
    (i) a core made of a nonlinear optical material; and
    (ii) cladding surrounding said core, for converting a fundamental applied to an end of said core to a second harmonic and radiating said second harmonic into said cladding to eliminate interference between waves traveling in a guided mode in which the fundamental is guided through said core and waves traveling in a radiation mode in which the second harmonic is radiated into said cladding, said cladding having a diameter of at least 500 μm.

2. An optical wavelength converter device according comprising:
    a core made of a nonlinear optical material; and
    (ii) cladding surrounding said core, for converting a fundamental applied to an end of said core to a second harmonic and radiating said second harmonic into said cladding to eliminate interference between waves traveling in a guided mole in which the fundamental is guided through said core and waves traveling in a radiation mode in which the second harmonic is radiated into said cladding, said cladding having a diameter of at least 500 μm;
    wherein said diameter of the cladding is greater than or equal to $L \cdot \tan \theta + d$, where d is the diameter of said core, $\theta$ the phase matching angle of the second harmonic, and L the length of the optical wavelength converter device.

3. An optical wavelength converter device comprising:
    (i) a core made of a nonlinear optical material; and
    (ii) cladding surrounding said core, for converting a fundamental applied to an end of said core to a second harmonic and radiating said second harmonic into said cladding to eliminate interference between waves traveling in a guided mode in which the fundamental is guided through said core and waves traveling in a radiation mode in which the second harmonic is radiated into said cladding, said cladding having a diameter of at least 500 μm;
    wherein said diameter of the cladding is greater than or equal to $2L \cdot \tan \theta + d$, where d is the diameter of said core, $\theta$ the phase matching angle of the second harmonic, and L the length of the optical wavelength converter device.

4. Am optical wavelength converter device comprising:
    (i) a core made of a nonlinear optical material; and
    (ii) cladding surrounding said core, for converting a fundamental applied to an end of said core to a second harmonic and radiating said second harmonic into said cladding to eliminate interference between waves traveling in a guided mode in which the fundamental is guided through said core and waves traveling in a radiation mode in which the second harmonic is radiated into said cladding;
    wherein the diameter of the cladding is greater than or equal to $L \cdot \tan \theta + d$, where d is the diameter of said core, $\theta$ the phase matching angle of the second harmonic, and L the length of the optical wavelength converter device.

5. An optical wavelength converter device comprising:
    (i) a core made of a nonlinear optical material; and
    (ii) cladding surrounding said core, for converting a fundamental applied to an end of said core to a second harmonic and radiating said second harmonic into said cladding to eliminate interference between waves traveling in a guided mode in which the fundamental is guided through said core and waves traveling in a radiation mode in which the second harmonic is radiated into said cladding;
    wherein the diameter of the cladding is greater than or equal to $2L \cdot \tan \theta + d$, where d is the diameter of said core, $\theta$ the phase matching angle of the second harmonic, and L the length of the optical wavelength converter device.

* * * * *